United States Patent [19]

Murakami et al.

[11] Patent Number: 5,059,749
[45] Date of Patent: Oct. 22, 1991

[54] INPUT/OUTPUT APPARATUS AND METHOD THEREFOR

[75] Inventors: Azuma Murakami; Akio Kikuchi; Toshihide Chikami, all of Saitama, Japan

[73] Assignee: Wacom Co., Ltd., Saitama, Japan

[21] Appl. No.: 497,332

[22] Filed: Mar. 22, 1990

[30] Foreign Application Priority Data

Mar. 24, 1989 [JP] Japan .................................. 1-72453

[51] Int. Cl.[5] ............................................. G08C 21/06
[52] U.S. Cl. ..................................................... 178/19
[58] Field of Search ..................... 178/18, 19; 340/713

[56] References Cited

U.S. PATENT DOCUMENTS 4,848,496 7/1989 Murakami ............................. 178/19

Primary Examiner—Stafford D. Schreyer
Attorney, Agent, or Firm—Lowe, Price, LeBlanc & Becker

[57] ABSTRACT

An input/output apparatus includes a coordinate input device and a display device which are stacked on each other. The coordinate input device detects position coordinates of an input designating device by (a) intermittently transmitting radio waves from a tablet to excite a tuned circuit incorporated in the input designating device and (b) receiving radio waves generated by the tuned circuit while transmission of radio waves by the tablet is suspended. The times while the display data latch pulses are generated in the display device is synchronized with the transmission of radio waves from the tablet in the coordinate input device. In consequence, noise is not generated in synchronism with the generation of the display data latch pulses while the tablet receives the radio waves, so noise is not imposed on a signal received by the tablet. As a result, there is no reduction in the accuracy with which position is detected on the basis of the received radio waves and malfunction of the apparatus is substantially eliminated.

20 Claims, 6 Drawing Sheets

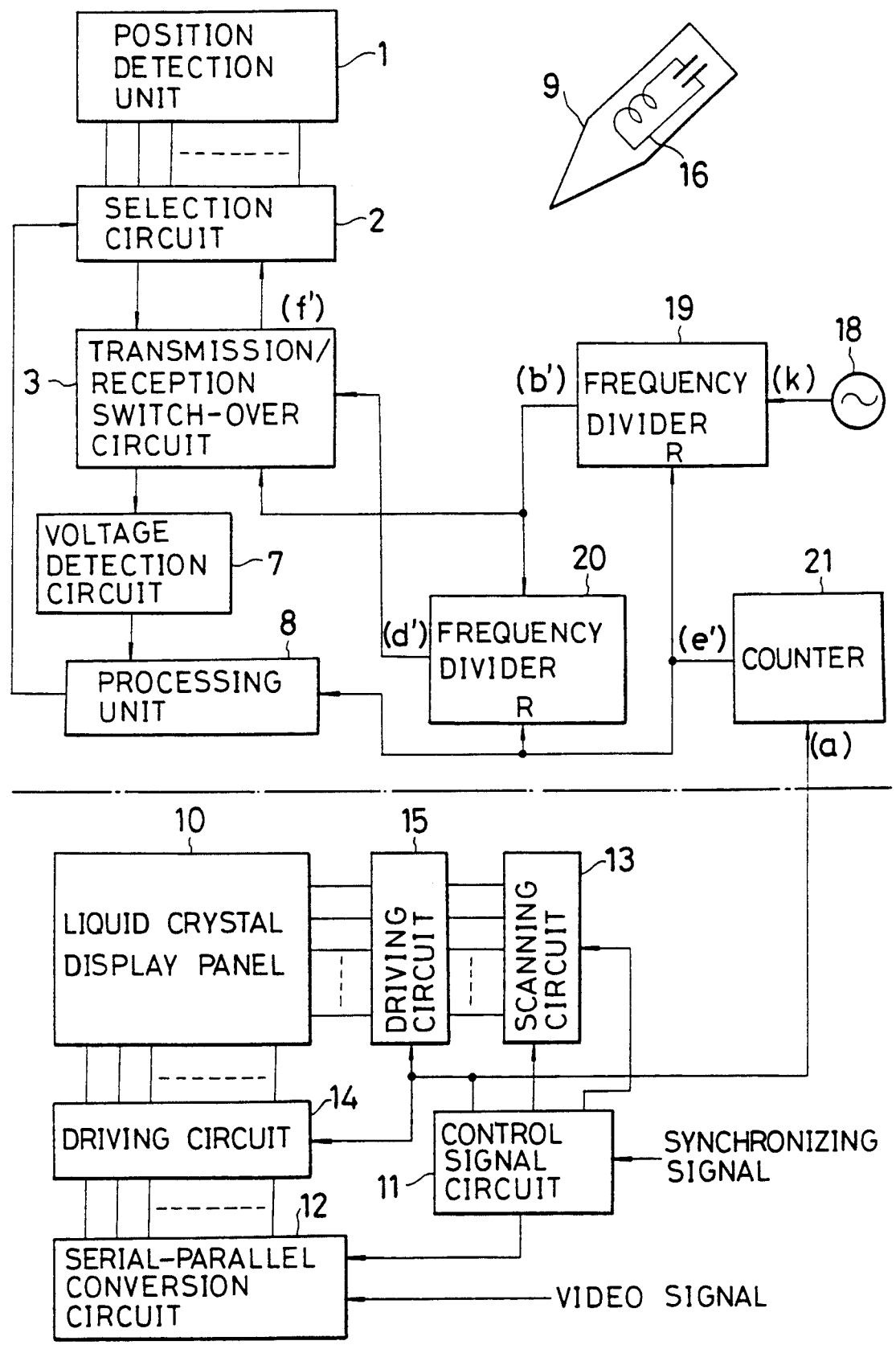

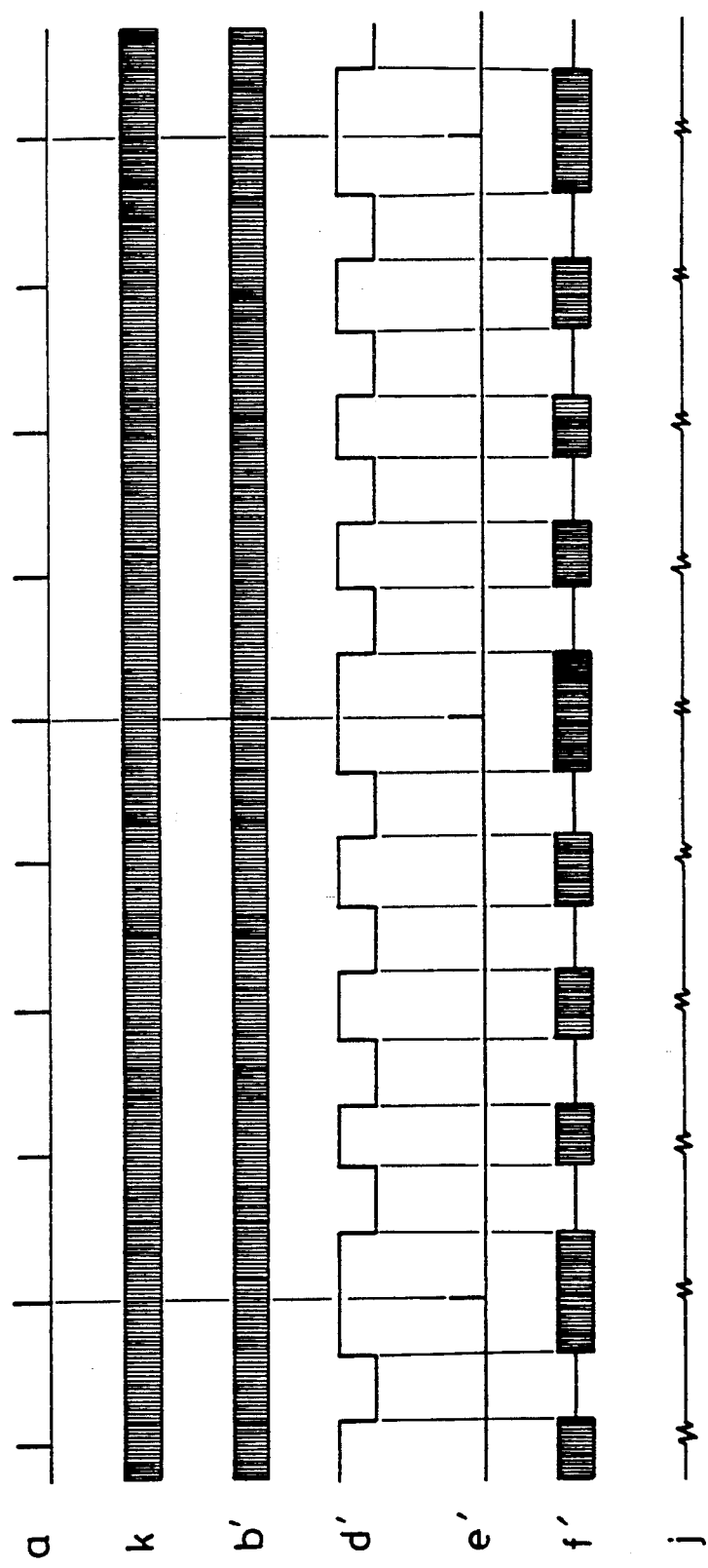

INPUT/OUTPUT APPARATUS AND METHOD THEREFOR

FIELD OF THE INVENTION

The present invention relates to an input/output apparatus in which a coordinate input device and a display device are stacked on each other and a method of operating same. More particularly, the present invention pertains to an input/output method and apparatus for reducing malfunctions of a coordinate input device or other adverse effects caused by noise generated by a display device.

DESCRIPTION OF THE RELATED ART

In commonly assigned and invented U.S. patent application Ser. No. 283,713, filed Dec. 13, 1988 (hereinafter referred to as the prior application) there is disclosed a coordinate input device for detecting coordinates of an implement by transmitting and receiving radio waves between a tablet and a position designating device that is combined with a display device.

The prior application is now briefly described. The coordinate input device transmits radio waves having a predetermined frequency from a loop coil in the tablet. A tuned circuit in the implement receives these radio waves. When the tuned circuit receives the radio waves, it transmits radio waves that are received by the loop coil in the tablet when transmission of the radio waves is suspended. The radio waves received by the loop coil cause an induced voltage to be generated in the loop coil. The operation is sequentially repeated in a plurality of loop coils by sequentially switching the coils between a transmitter and receiver. The coordinates of a position designated with the input device are detected in response to the voltage induced in the respective loop coils. The detected coordinates are sent to a host computer.

The host computer generates and transmits to a display device a video signal and a corresponding synchronizing signal in response to various data including the detected coordinates. The display device generates various types of control signals in response to the synchronizing signal and thereby displays the video signal data corresponding to a single line in accordance with a display data latch pulse which is one of the various types of control signals. Thereafter, the display device repeats the process until it displays data corresponding to a single screen.

In the above-described apparatus, the coordinate input device and the display device are operated independently in response to the separate clock pulses. Noise thereby generated as a consequence of the control signals being generated in the display device, particularly, the display data latch pulses, interferes with the signal received by the tablet of the coordinate input device, to deteriorate the position detection accuracy and cause malfunctions.

SUMMARY OF THE INVENTION

A primary object of the present invention is to provide a new and improved input/output apparatus for and method of enabling adverse effects of noise generated by a display device associated with a position detector to be substantially eliminated.

In order to achieve the above-described object, the present invention provides an input/output apparatus in which a coordinate input device and a display device are combined to form a single unit. The coordinate input device detects position coordinates of an input device, i.e. implement, waves from a tablet to excite a tuned circuit incorporated in the implement. Radio waves generated by the tuned circuit are transduced back to and received by the tablet while transmission of the radio waves is suspended. The timing of display data latch pulses generated by the display device is synchronized with the transmission of radio waves from the tablet in the coordinate input device.

According to the present invention, noise, generated in synchronism with the generation of the display data latch pulses, is not generated while the tablet receives the radio waves so noise does not interfere with the signal received by the tablet. As a result, there is no deterioration in the accuracy with which the position is detected in response to the received radio waves nor is there a malfunction of the coordinate input device.

A second object of the present invention is to provide a compact, easy to handle input/output apparatus which is not adversely affected by noise generated by a display device so that the apparatus is highly accurate.

In order to achieve the above-described second object, the present invention provides an input/output apparatus in which a coordinate input device and a display device are combined to form a single unit. The coordinate input device is adapted to detect position coordinates designated by an input designating device, i.e., implement, by (a) intermittently transmitting radio waves from a tablet to excite a tuned circuit incorporated in the implement, and (b) receiving radio waves generated by the tuned circuit while the tablet suspends transmission of the radio waves. The time when display data latch pulses are generated in the display device is synchronized with the transmission of radio waves from the tablet in the coordinate input device. The coordinate input device and the display device are preferably stacked on each other.

According to the present invention, adverse effects of noise generated by the display device are substantially eliminated so data can be supplied and derived with a high degree of accuracy. Furthermore, the input/output apparatus is easy to handle because it is compact and incorporates the coordinate input device and the display device as one unit and because it is not necessary to take noise into consideration during use.

Other and further objects, features and advantages of the invention will appear more fully from the following description.

BRIEF DESCRIPTION OF DRAWING

FIG. 3, is a perspective external view of an input/output apparatus according to the present invention;

FIG. 5 is a block diagram of a second embodiment of the present invention; and

FIG. 6 are waveforms of signals generated by various circuits of the input/output apparatus of FIG. 5.

DETAILED DESCRIPTION OF THE PREFERRED EMBODIMENTS

A first embodiment of the present invention is described below with reference to FIGS. 1 to 4.

Figure 1:
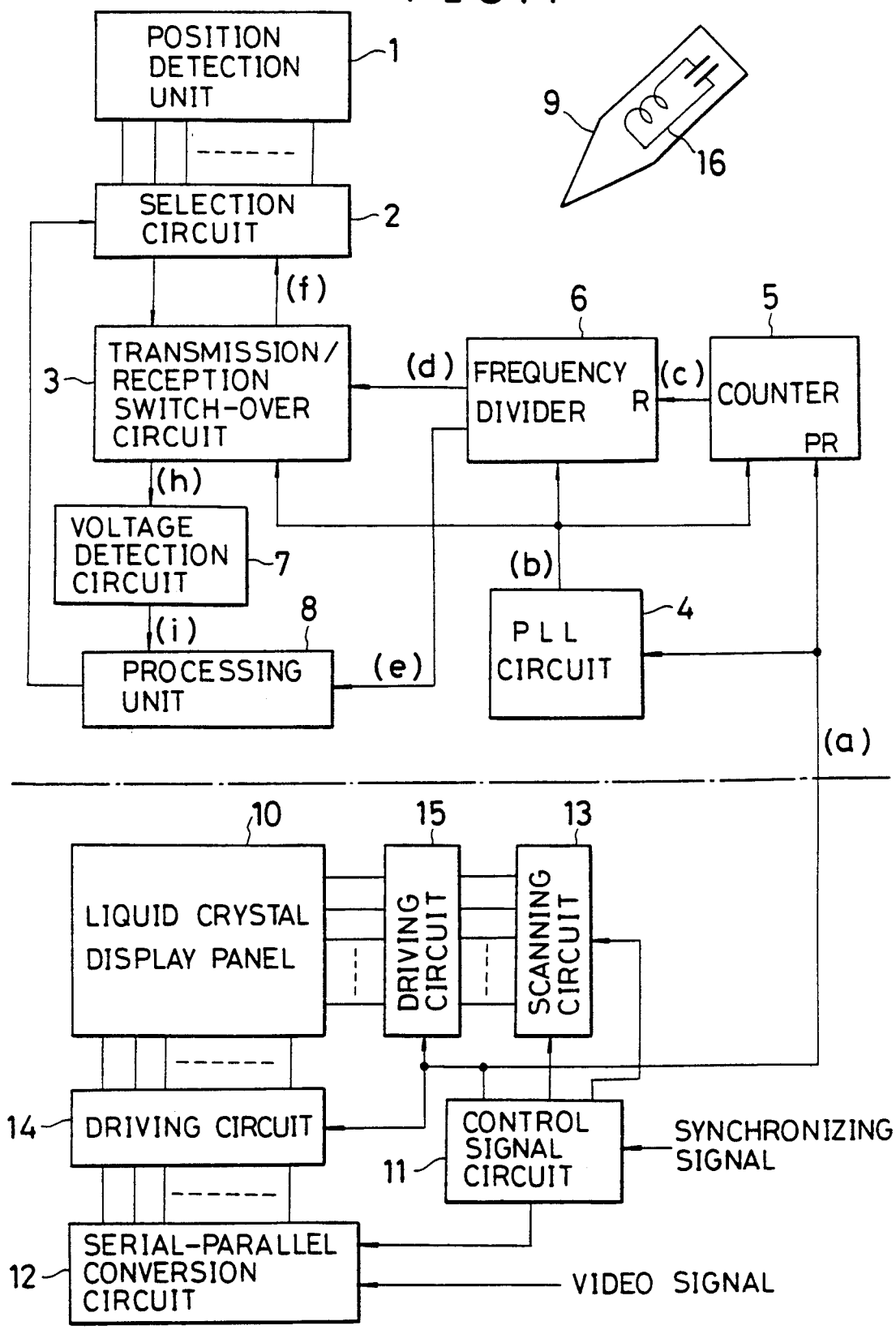
FIG. 1 is a block diagram of a first embodiment of the present invention.

Referring first to FIG. 1, an input/output apparatus includes a position detecting unit 1, a selection circuit 2, a transmission/reception switching-over circuit 3, a phase synchronizing (phase-locked loop) circuit 4, a counter 5, a frequency-divider 6, a voltage detecting circuit 7, a processing unit 8, an input pen 9, a liquid-crystal display panel 10, a control signal circuit 11, a serial-parallel conversion circuit 12, a scanning circuit 13, and driving circuits 14 and 15.

Figure 2:
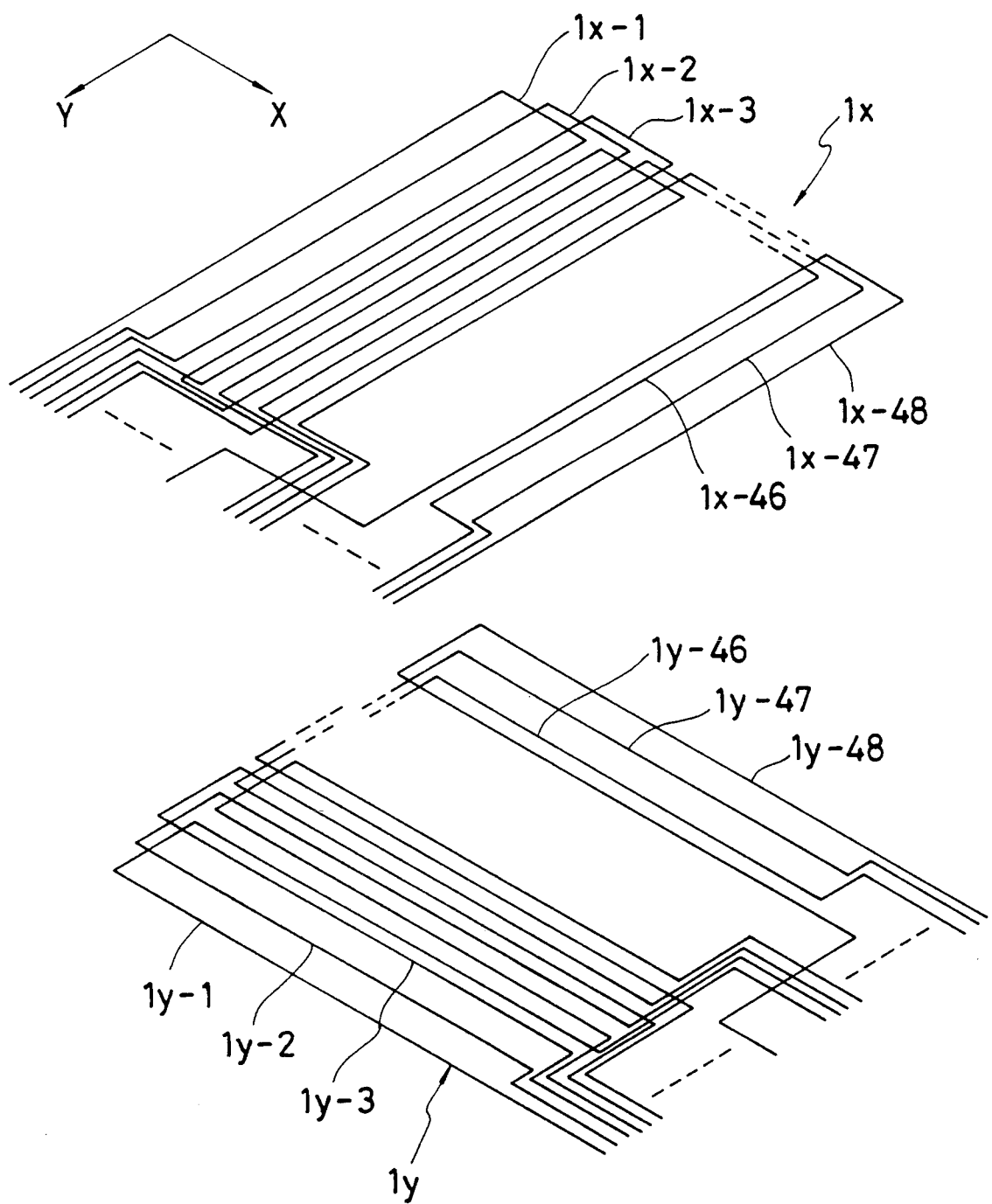

The position detection unit 1 includes an X-direction loop coil group lx and Y-direction loop coil group ly, as shown in FIG. 2. The X-direction loop coil group lx includes a number of loop coils, e.g., 48 loop coils 1x-1, 1x-2, to 1x-48, which are disposed parallel to each other in such a manner that they overlap in the X-direction, and the Y-direction loop coil group ly includes a number of loop coils, e.g., 48 loop coils 1y-1, 1y-2, to 1y-48, which are disposed parallel to each other in such a manner that they overlap in the Y-direction. The X-direction loop coil group 1x and the Y-direction loop coil group ly are in close proximity with each other and stacked on each other (although they are illustrated separately in FIG. 2 for convenience of understanding). In this embodiment, each loop coil has a single turn. However, each loop coil may have a plurality of turns.

The selection circuit 2 selects one loop coil from the X-direction loop coil group 1x and the Y-direction loop coil group ly in accordance with the selection information derived from the processing unit 8.

The transmission/reception switch-over circuit 3 connects a single loop coil selected from the X- and Y-direction loop coil groups 1x and ly alternately to be responsive to an output of the PLL circuit 4 through a driving circuit and a low-pass filter (not shown) and alternately to supply a signal to the processing unit 8 through the voltage detection circuit 7. The switch-over operation is conducted by means of a transmission/reception switch-over signal described later.

The PLL circuit 4 is supplied with a display data latch pulse "a" having a predetermined frequency fH (12.5 kHz, in the described embodiment) to derive a reference clock "b" having a frequency f1 (400 kHz in this embodiment) that is an integral multiple, e.g., 32 times that of the predetermined frequency fH. Circuit 44 supplies the derived clock in parallel to the counter 5, the frequency divider 6, and the transmission/reception switch-over circuit 3 through the low-pass filter and the driving circuit.

The counter 5 is a preset counter having an initial value m, ("28" in this embodiment). Counter 5 is preset when the display data latch pulse "a" is received thereby. The counter 5 counts down the reference clocks "b" and supplies a reset pulse c to the frequency divider 6 when the counter has counted down to "0".

The frequency divider 6 is reset by reset pulse c, to derive a transmission/reception switch-over signal "d" having a predetermined frequency fk (12.5 kHz in this embodiment), equal to the frequency fH. Divider 6 divides the reference clock "b" by a factor of 32, to derive a signal that is supplied to the transmission/reception switch-over circuit 3. Also, the frequency divider 6 derives a loop coil switch-over signal "e" having a predetermined frequency fc (3.125 kHz in this embodiment) by dividing the reference clock "b" by a factor of 128, to derive a signal that is supplied to the processing unit 8.

The voltage detection circuit 7 includes an amplifier, a ceramic filter which passes a signal having the frequency f1 (in this embodiment, 400 kHz), a detector, and a low-pass filter. The voltage detection circuit 7 derives a d.c. signal having a voltage corresponding to the energy of the frequency f1 component in an input signal.

The processing unit 8 is composed of a known microprocessor or the like. The processing unit 8 receives the loop coil switch-over signal "e" to control switch-over of the X- and Y-direction loop coils in the position detection unit 1 through the selection circuit 2. The processing unit 8 also converts an analog induced voltage value into a digital value. The analog induced voltage value is supplied to unit 8 by cascaded transmission/reception switch-over circuit 3 and voltage detection circuit 7. The digital value derived by unit 8 represents the coordinates of a position designated by input pen, i.e., implement, 9. Unit 8 derives an indication of the designated position by conducting predetermined operations on the converted value, and transfers the obtained coordinates to a host computer (not shown).

The input pen 9 which serves as an input designating device incorporates a tuned circuit 16 including only passive elements such as coils and capacitors. The resonant frequency of tuned circuit 16 is set so the tuned circuit responds to the 400 kHz frequency f1 of the reference clock "b".

The liquid crystal display panel 10 is of a known matrix display type including a liquid crystal medium hermetically sealed between a number of horizontal electrodes and a large number of vertical electrodes.

The control signal circuit 11 generates various types of control signals, including a display data latch pulse "a" and a shift pulse, in response to a synchronizing signal derived, together with a video signal, from a host computer. The host computer also derives a video signal that is supplied to serial-parallel conversion circuit 12. The serial-parallel conversion circuit 12 responds to the shift pulse to store the serial data which corresponds to one line in the video signal.

The scanning circuit 13 stores information derived by circuit 11 representing the position of horizontal electrodes in unit 10 which are to be driven.

In response to data latch pulse "a" being supplied to the driving circuits 14 and 15, the circuits apply a driving voltage to the vertical and horizontal electrodes of the liquid crystal display panel 10 in response to information stored in the serial-parallel conversion circuit 12 and the scanning circuit 13 to form a displayed image for a single line when it receives the display data latch pulse "a". Thereafter, the driving circuits 14 and 15 repeat the process to display an image corresponding to a single screen.

Figure 3:
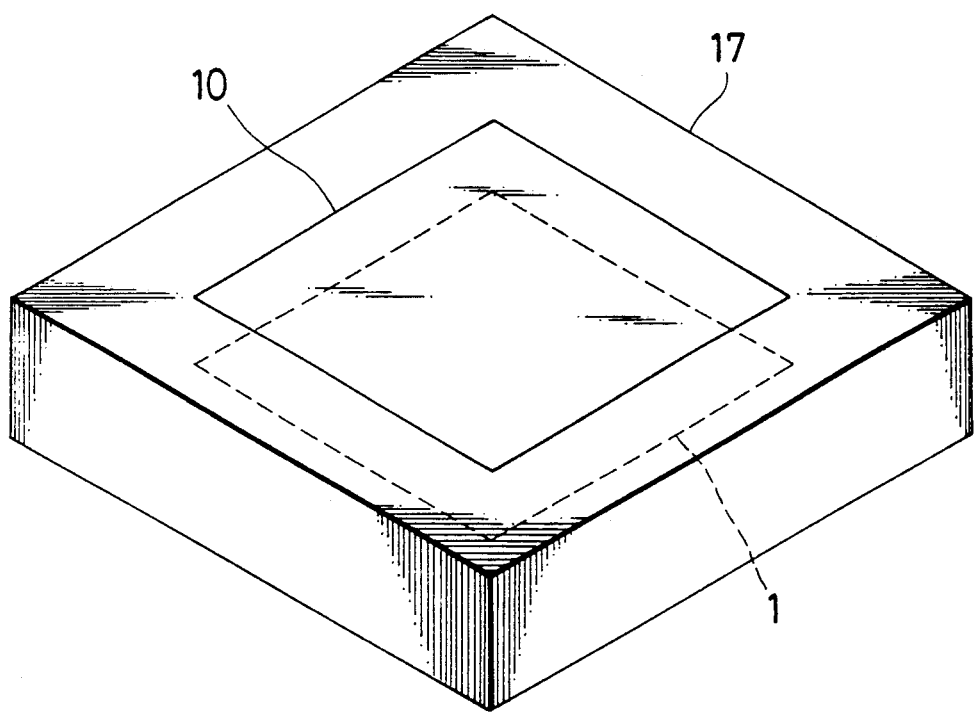
FIG. 3 is a schematic view of the coils of a position detecting unit in detail.

The circuits 1 to 8 in combination form a tablet, and the circuits 10 to 15 in combination form a display device. Both the tablet and the display device are housed as a unit in a non-metal casing 17 as shown in FIG. 3. The input region of the position detection unit 1 is substantially equal to the display area of the liquid crystal display panel 10. The liquid crystal display panel 10 is stacked on top of the position detection unit 1 in such a manner that the display positions of panel 10 are aligned with the input positions thereof with a reflecting layer having radio wave transmissible property or a backlighting source (not shown) being interposed therebetween.

Figure 4:
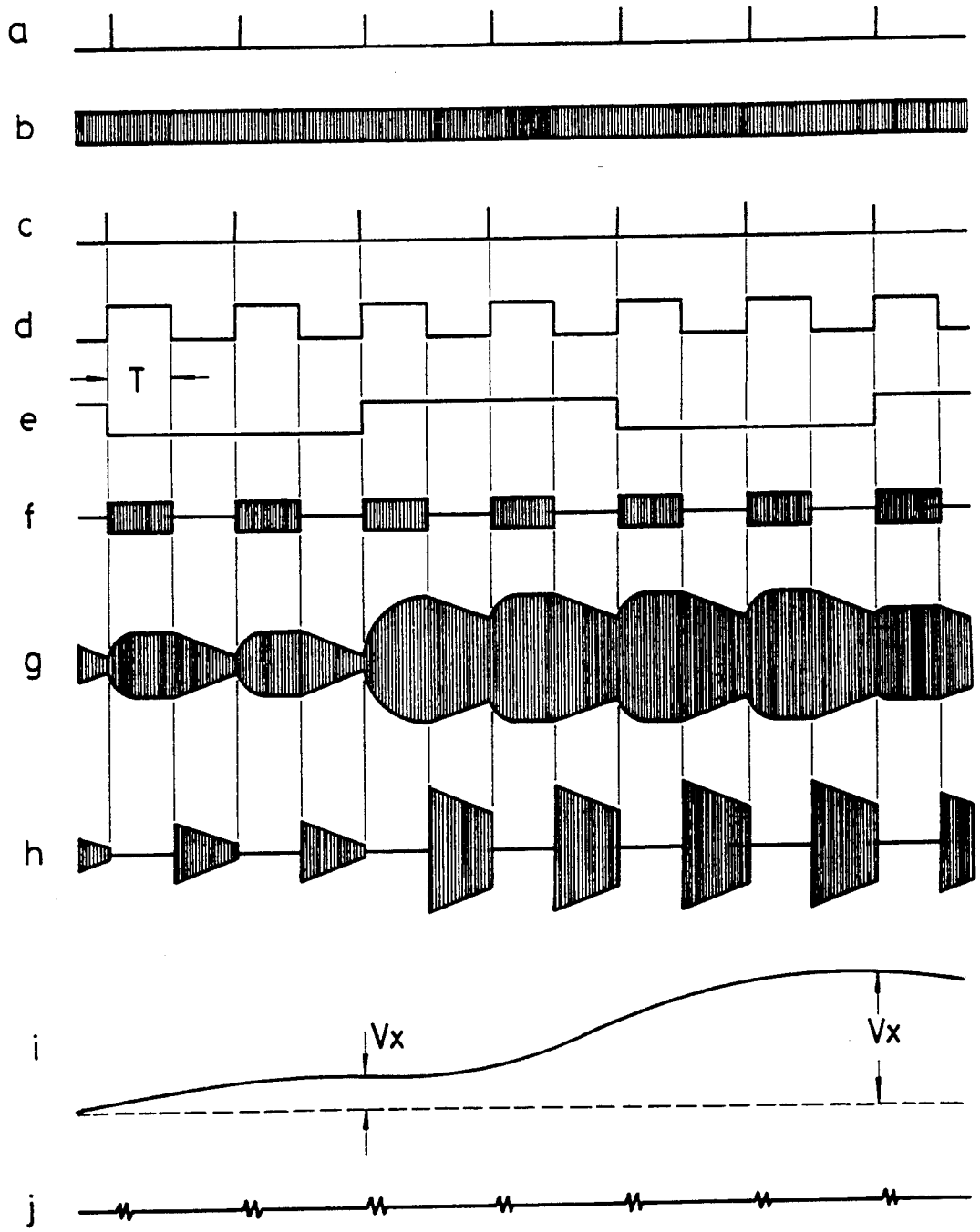
FIG. 4 are waveforms of signals generated by various circuits of the input/output apparatus of FIG. 1.

The operation of the thus-arranged input/output apparatus is now described with reference to FIG. 4.

The reference clock "b" is converted into a sinusoidal wave signal by being passed through the low-pass filter and the driving circuit. The converted sinusoidal wave signal is supplied to and received by the transmission/reception switch-over circuit 3. At that time, since the transmission/reception switch-over circuit 3 is connected to either the PLL circuit 4 or the voltage detection circuit 7, on the basis of the transmission/reception switch-over signal d, the signal "f" is derived from the transmission/reception switch-over circuit 3 and supplied to the selection circuit 2. Signal "f" has equal on and off time intervals of T ($=\frac{1}{2}$ fk) (40 micro-seconds in the described embodiment).

The signal "f" is supplied to a single loop coil in the position detection unit 1, e.g., a loop coil 1X-i (i=1m 2m to 48). Upon receipt of the signal "f", the loop coil 1x-i generates radio waves on the basis of the signal "f".

At that time, if the input pen 9 is held substantially in an upright state proximate position detection unit 1, i.e., pen 9 is being used on the position detection unit 1, the radio waves generated by the loop coil 1x-i excite the tuned circuit 16 in the input pen 9 to thereby induce a voltage "g" in synchronism with the signal "f".

Thereafter, while signal "f" is off, i.e., during a reception period while loop coil 1x-i is connected to the voltage detection circuit 7, the radio wave generated by the loop coil 1x-i immediately disappears while the induced voltage "g" gradually decreases to an extent dependent upon the losses of tuned circuit 16.

The current that flows in the tuned circuit 16 on the basis of the induced voltage "g" transmits radio waves, which reversely excite the loop coil 1x-i connected to the voltage detection circuit 7, to thereby generate an induced voltage in the loop coil 1x-i. This induced voltage is derived as a reception signal "h", supplied by the transmission/reception switch-over circuit 3 to the voltage detection circuit 7 only during reception periods of the transmission/reception switch-over circuit 3.

The intermittent frequency f1 components in signal "h" are converted by voltage detection circuit 7 into DC signal "i" because the ceramic filter in circuit 7 passes frequency f1. D.C. signal "i", having successive voltages, is supplied to the processing unit 8.

The voltage of signal "i" varies in accordance with the energy of the f1 frequency component in the signal "h". When transmission and reception of the radio waves having the f1 frequency component has been repeated between one loop coil 1x-i and the input pen 9 a plurality of times (four times in this embodiment), and when a predetermined number of signal components having the same degree of energy (at least four signal components in this embodiment), have been supplied to circuit 7 input, the output signal components of circuit 7 converge to a fixed voltage value Vx.

The voltage Vx of the signal "i" is dependent on the distance between the input pen 9 and the loop coil 1x-i, i.e., is substantially inversely proportional to the fourth power of the distance between pen 9 and coil 1x-i. Voltage Vx changes with switch-overs of the loop coil 1x-i. Hence, the coordinate in the x direction of the position designated with the input pen 9 is obtained by processing unit 8 converting the analog voltage value Vx obtained for each loop coil into a digital value and by conducting predetermined operations on the obtained digital value. The coordinate in the Y direction of the position designated with the input pen 9 can be obtained in a similar manner.

The liquid crystal display panel 10 displays an image on the basis of the video signal and the synchronizing signal which are derived by the host computer. While the video and synchronizing signals are derived by the host computer, noise pulses of waveform "j" are generated in synchronism with display data latch pulses of waveform "a".

However, the noise pulses of waveform "j" are generated while the radio waves are generated by the position detection unit 1, and thus are not mixed into the reception signal "h". As a result, there is no interruption to the detection process for the position designated by input pen 9, and there is no reduction in the detection accuracy.

Because coordinate detection is performed in the same manner as that in which it is conducted in the aforementioned prior application, the detailed description thereof is omitted.

FIG. 5 is a block diagram of another embodiment of the present invention in which a clock generator for generating a clock which is asynchronous with the display data latch pulse is incorporated in the tablet. More specifically, a clock oscillator 18 generates a clock pulse "k" having a predetermined frequency f0 (1.78 mHz in this embodiment), and supplies it to a frequency divider 19. The frequency divider 19 derives a reference clock "b," having a frequency f1' (445 kHz in this embodiment), by dividing the frequency of the clock pulse "k" by a factor of 4. Divider 19 supplies reference clock "b," to the transmission/reception switch-over circuit 3 and frequency divider 20. The frequency divider 20 derives a transmission/reception switch-over signal "d" having a predetermined frequency fk, (13.9 kHz in this embodiment) by dividing the frequency of reference clock "b," by a factor of 32. Divider 20 supplies the thus obtained signal "d," to the transmission/reception switch-over circuit 3. Control signal circuit 11 supplies counter 21 with the display data latch pulse "a" having the frequency fH (12.5 kHz in this embodiment), causing counter 21 to derive a single loop coil switch-over signal "e," each time it counts four display data latch pulses "a". Counter 21 supplies signal "e'" to the reset terminals of the frequency dividers 19 and 20 and processing unit 8.

FIG. 6 includes signal waveforms derived in the circuit shown in FIG. 5. In this second embodiment, the noise pulses of waveform "j" are generated in synchronism with the display data latch pulse "a" while the frequency f1' component of waveform "f" is derived, i.e., while coil 1x-i is supplying a wave to pen 9. Thereby the adverse effects of noise pulses of waveform j on the operation of the tablet and the input pen 9 are thereby substantially eliminated, as in the first embodiment. Other structures and functions are the same as those of the embodiment shown in FIG. 1 with the exception that the center frequency of the bandwidth of the ceramic filter in the voltage detection circuit 7 and the tuning frequency of the tuning circuit 16 in the input pen 9 are f1'.

In the above-described embodiments, the same loopcoils in the tablet are used to transmit and receive the radio waves. However, separate loop coils for transmitting and receiving radio waves may be provided. Furthermore, an operate state of the input pen may be identified by changing the frequency or the phase of the tuning circuit in accordance with the changes in the operated state of the input pen and by detecting this change in the tablet.

What is claimed is:

1. An input/output apparatus comprising:
a coordinate input device wherein radio waves are intermittently transmitted from a tablet, said radio waves excite a tuned circuit incorporated in an input designating device, said tablet suspending transmission of said radio waves and receiving radio waves transmitted by said tuning circuit and thereby the coordinates of a position designated with said input designating device are detected;
a display device,
characterized in that the times while display data latch pulses are generated in said display device is synchronized with the transmission period of said radio waves from said tablet.

2. An input/output apparatus according to claim 1, wherein said coordinate inpur device and said display device are stacked on each other.

3. An input/output apparatus aocording to claim 1 wherein said coordinate input device and said display device are housed in a non-metal casing as one unit.

4. An input/output apparatus according to claim 1, wherein said display device includes a liquid crystal display panel.

5. An input/output apparatus acoording to claim 4, wherein an input area of said tablet and a display area of said liquid crystal display panel are substantially equal.

6. An input/output apparatus according to claim 4, wherein said liquid crystal display panel is placed on top of said tablet in such a manner that display positions thereof can correspond with input positions thereof, through a reflecting plate having radio-wave-transmissible property or a backlighting source being interposed therebetween.

7. An input/output method employing a coordinate input designating device, a tablet and a display device in superposed relation to the tablet, including the steps of:
intermittently transmitting radio waves from the tablet;
exciting a tuned circuit incorporated in said coordinate input designating device by said radio waves;
receiving radio waves generated by said coordinate input designating device while transmission of said radio waves by the tablet is suspended;
detecting the coordinates of a position designated by said coordinate input designating device, to display them on said display device,
characterized in that the times while display data latch pulses are generated in said display device is synchronized with the transmission of radio waves from said table to said coordinate input designating device.

8. Apparatus for determining the position of an implement including a tuned circuit having a predetermined resonant frequency comprising a tablet including a two dimensional array of coils for coupling energy at the resonant frequency to the implement and for receiving energy at ther esonant frequency from the tuned circuit while the implement is in proximity to the tablet,
a display device for the position of the implement relative to the tablet responsive to display data latch pulses, and
means intermittently energizing coils of the array for intermittently coupling the energy at the resonant frequency from the tablet to the implement, the energy being intermittently coupled in synchronism with coupling of the display data latch pulses to the display device so the data latch pulses are derived only at times energy at the resonant frequency is coupled from coils of the array to the implement.

9. The apparatus of claim 8 wherein the tablet and display are in close proximity so that there is a tendency for energy of the data latch pulses to be coupled as noise to coils of the tablet.

10. The apparatus of claim 9 wherein the tablet and display are in superposed relation with each other.

11. The apparatus of claim 10 further including a non-magnetic housing in which the tablet and display are located.

12. In combination, an implement including a tuned circuit having a predetermined resonant frequency, a tablet including a two dimensional array of coils for coupling energy at the resonant frequency to the implement and for receiving energy at the resonant frequency from the tuned circuit while the implement is in proximity to the tablet,
a display device for the position of the implement relative to the table responsive to display data latch pulses, and
means intermittently energizing coils of the array for intermittently coupling the energy at the resonant frequency from the table to the implement, the energy being intermittently coupled in synchronism with coupling of the display data latch pulses to the display device so the data latch pulses are derived only at times energy at the resonant frequency is coupled from coils of the array to the implement.

13. The combination of claim 12 further including a non-magnetic housing in which the tablet and display are located.

14. The combination of claim 12 wherein the tablet and display are in close proximity so that there is a tendency for energy of the data latch pulses to be coupled as noise to coils of the tablet.

15. The combination of claim 12 wherein tablet and display are in superposed relation with each other.

16. A method of determining and displaying on a display device the position of an implement relative to a tablet including a two dimensional array of coils, the coils of the array being intermittently energized, the implement including a tuned circuit having a predetermined resonant frequency, the display device being responsive to display data latch pulses, comprising placing the implement proximate the tablet, and coupling energy at the resonant frequency from coils of the array to the implement and coupling to coils of the array energy at the resonant frequency from the tuned circuit while the implement is in proximity to the tablet so: (a) there is intermittent coupling of the energy at the resonant frequency from the table to the implement in synchronism with coupling of the display data latch pulses to the display device, and (b) the data latch pulses are derived only at times energy at the resonant frequency is coupled from coils of the array to the implement.

17. A method of determining and displaying on a display device the position of an implement relative to a tablet, the implement including a tuned circuit having a predetermined resonant frequency, the display device being responsive to display data latch pulses, the display data latch pulses tending to produce noise on the display, the tablet including a two dimensional array of coils, comprising intermittently coupling energy at the resonant frequency from coils of the array to the implement, the implement tuned circuit responding to the energy at the resonant frequency to couple to coils of the array energy at the resonant frequency while the implement is in proximity to the tablet, and timing the occurrence of the data latch pulses and the intermittent energization of coils of the tablet such that the tendency of the noise to affect the display is overcome.

18. The method of claim 17 wherein the timing is such that the data latch pulses are derived only while the coils are coupling energy at the resonant frequency to the implement.

19. An input/output apparatus comprising:
- a coordinate input device wherein waves having magnetic components are intermittently transmitted from a tablet, said waves having magnetic components exciting a tuned circuit incorporated in an input designating device, said tablet suspending transmission of said waves having magnetic components, receiving waves having magnetic components transmitted by said tuning circuit to thereby detect the coordinates of a position designated with said input designating device;
- a display device,
  characterized in that the times while display data latch pulses are generated in said display device is synchronized with the transmission period of said waves having magnetic components from said tablet.

20. An input/output method employing a coordinate input designating device, a tablet and a display device in superposed relation with the tablet, including the steps of:
- intermittently transmitting waves having magnetic components form the tablet;
- exciting a tuned circuit incorporated in said coordinate input designating device by said waves having magnetic components;
- receiving waves having magnetic components generated by said coordinate input designating device while transmission of said waves having magnetic components by the tablet is suspended;
- detecting the coordinates of a position designated by said coordinate input designating device, to display them on said display device,
  characterized in that the times while display data latch pulses are generated in said display device is synchronized with the transmission of waves having magnetic components from said tablet to said coordinate input designating device.

* * * * *